(12) United States Patent
Bloore et al.

(10) Patent No.: US 9,262,441 B2
(45) Date of Patent: Feb. 16, 2016

(54) WILDCARD COLOR SEARCHING

(71) Applicants: Paul Bloore, Toronto (CA); Adrian Domsa, Markham (CA); Melina Stathopoulos, Toronto (CA); Michael Jamieson, Waterloo (CA)

(72) Inventors: Paul Bloore, Toronto (CA); Adrian Domsa, Markham (CA); Melina Stathopoulos, Toronto (CA); Michael Jamieson, Waterloo (CA)

(73) Assignee: IDÉE INC., Toronto, Ontario (CA)

( * ) Notice: Subject to any disclaimer, the term of this patent is extended or adjusted under 35 U.S.C. 154(b) by 0 days.

(21) Appl. No.: 14/168,537

(22) Filed: Jan. 30, 2014

(65) Prior Publication Data
US 2014/0334722 A1  Nov. 13, 2014

Related U.S. Application Data

(60) Provisional application No. 61/821,547, filed on May 9, 2013.

(51) Int. Cl.
*G06K 9/34* (2006.01)
*G06F 17/30* (2006.01)
*G06K 9/46* (2006.01)

(52) U.S. Cl.
CPC .......... *G06F 17/3025* (2013.01); *G06K 9/4652* (2013.01)

(58) Field of Classification Search
CPC ..... G06T 7/408; G06T 7/0079; G06T 19/006; G06T 5/006; G06T 7/0081; G06T 2207/10024; G06T 2207/10016; G06T 7/0083; G06K 9/4652; G06K 9/38; G06K 9/4609; G06K 9/48
See application file for complete search history.

(56) References Cited

U.S. PATENT DOCUMENTS

| | | | |
|---|---|---|---|
| 7,379,627 B2* | 5/2008 | Li et al. | 382/305 |
| 7,945,078 B2* | 5/2011 | Sugaya | 382/128 |
| 8,392,347 B2* | 3/2013 | Fujieda et al. | 706/25 |
| 8,582,802 B2* | 11/2013 | Clippard et al. | 382/100 |
| 2007/0122031 A1* | 5/2007 | Berriss et al. | 382/165 |
| 2014/0139552 A1* | 5/2014 | Morinaga et al. | 345/633 |
| 2014/0334722 A1* | 11/2014 | Bloore et al. | 382/164 |

* cited by examiner

*Primary Examiner* — Amir Alavi
(74) *Attorney, Agent, or Firm* — Norton Rose Fulbright Canada LLP

(57) ABSTRACT

A method of extracting the dominant colors from a set of target images and storing those colors in a database is described. A method of comparing colors stored in a database with a set of colors extracted from a query image. Also, a method of comparing colors stored in the database with a set of colors defined by a user using a color picker. The user defined colors may or may not include a wildcard color. The list of matching database images may or may no be filtered using metadata.

19 Claims, 7 Drawing Sheets
(3 of 7 Drawing Sheet(s) Filed in Color)

WILDCARD COLOR SEARCHING

CROSS-REFERENCE TO RELATED APPLICATIONS AND INCORPORATION BY REFERENCE

This application claims all benefit, including priority, of U.S. provisional patent application Ser. No. 61/821,547, entitled Wildcard Color Searching and filed 9 May 2013. The entire contents of that application, including any appendices, are incorporated herein by this reference.

FIELD OF THE INVENTION

The present invention relates to the field of color image search. The present invention more particularly relates to the field of searching color images based on their color distribution, using for example relatively few predefined query colors and one wildcard color.

BACKGROUND OF THE INVENTION

Among the most important features of an image is its color distribution. Some research has been done about extracting dominant colors from a particular image and then describing how those colors are distributed across the image. Also a few comparison methods have been developed for comparing images based on the extracted colors and their distribution.

All known existing color search implementations assume that the user knows exactly all colors he or she wishes to search for, and needs to retrieve images containing only those colors. In many cases this is not true, or possible; and the user may want to find images containing one or more known colors and one or more 'other,' unknown or unspecified colors. This scenario is not yet addressed by existing color comparisons methods, and therefore is not yet implemented by existing computer programs or web search engines.

SUMMARY OF THE INVENTION

The present invention provides methods of extracting sets of colors from images using image segmentation techniques, and methods of pruning, or restricting, these colors so that only the dominant colors are retained, or otherwise considered, for use in further processing.

The present invention also provides fast methods of comparing sets of colors extracted from query images with other sets of colors extracted from pools of potential match candidates, i.e., target images. Colors associated with both query and target images may be extracted in real time, and/or through the full or partial use of batch or other pre-processing techniques. For example, in some embodiments it may be efficient, or otherwise advantageous, to extract colors from query images in real time, or in other present, interactive fashion, while providing a pool or database of potential target images from which associated colors have been extracted beforehand.

Furthermore, the present invention provides fast methods of comparing sets of query colors, i.e., colors chosen by users, with sets of target colors extracted from images considered as candidates (i.e., target images). Users are enabled to designate a wildcard color to be used along with specified query colors in executing image comparisons.

Use of the invention can be particularly advantageous in situations in which, for example, a user does not know exactly all colors he or she wishes to search for, but needs or wishes to find images containing one or more known colors and one or more 'other,' unknown or unspecified colors. To illustrate this, a possible example is when the user wants to retrieve images containing 50% red, 20% blue and 30% any other colors (FIG. 5). The 30% 'other' colors do not need to be specified by the user and could be, for example, orange and green or just yellow, hence the term wildcard color.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Detailed descriptions of example embodiments are provided below, with reference to the following drawings.

It is to be understood that the description and drawings are only for the purpose of illustration and as an aid to understanding, and are not intended as a definition of the limits of the invention.

DESCRIPTION OF EMBODIMENTS

In one aspect, the disclosure provides image search systems comprising feature extraction modules for extracting color distributions and/or other desired features from images, database modules for storing and retrieving extracted features, and comparison modules for comparing features extracted from query images with sets of features associated with target images.

In various embodiments of these and other aspects, the disclosure provides image searching systems in which features represented by data extracted from query and target images include dominant colors and their distribution across such images.

In further aspects and embodiments, the disclosure provides corresponding and otherwise-related methods, processes, devices, and logic structures such as coded, machine-readable instruction sets.

Figure 1:
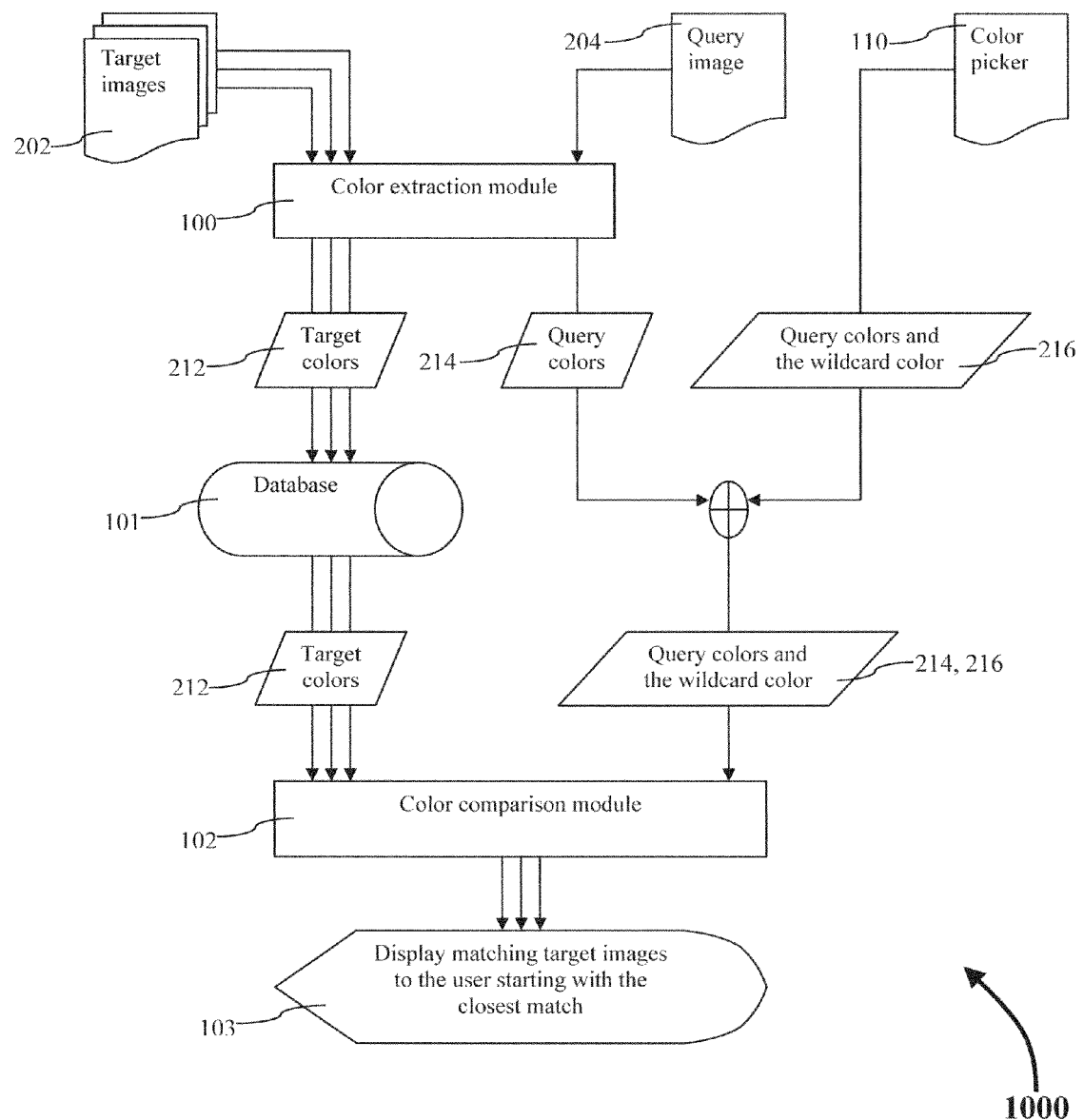
FIG. 1 is a block diagram illustrating a color searching system in accordance with the invention.

FIG. 1 provides a schematic view of a color searching system (1000) in accordance with the invention. In the embodiment shown, the system (1000) includes one or more color extraction modules (100), color picker(s) (110), database(s) (101), and color comparison module(s) (102). System(s) (1000) suitable for use in implementing the invention can further comprise any desired input, output, network and/or other signal communications, and/or other desired signal processing devices or components, including for example keyboards, keypads, point-and-select devices, displays, etc.

As will be understood by those skilled in the relevant arts, once they have been made familiar with this disclosure, modules (100), (102), color picker (110), and other components of the system (1000) can be implemented in any of a very wide range of manners compatible with the purposes disclosed herein, many of which are known and other which will doubtless hereafter be developed. Generally, they may comprise any devices and/or machine-executable instruction sets configured for accomplishing the purposes disclosed herein, including for example any suitably-configured signal and/or data processors or other hardware, firmware, and/or software, in any suitable combination(s).

Color extraction module(s) (100) can extract data (212) representing information such as colors and their distribution within image data associated with sets of target images (202), and store data (212) representing the extracted information in one or more databases (101). The same color extraction module(s) (100) can extract data (214) representing colors and their distribution from one or more query images (204), and provide such extracted query data (214) to color comparison module(s) (102).

Color comparison module(s) (102) can compare target colors (212) retrieved from database(s) (101) with query colors (214, 216). Query colors (214, 216) can be automatically generated from query image(s) (204) by color extraction module(s) (100) as mentioned above, and/or can be manually defined by a user using color picker(s) (110). User-defined query colors (216) may or may not include data representing a wildcard color. The color comparison module(s) (102) can generate one or more lists containing best matching target images (202) relative to the query colors (214, 216) according to one or more suitable criteria, including for example criteria established using color distance functions like Manhattan distance, Euclidean distance or Delta E distance algorithms. Such best matching target images (202) may be displayed to the user in sorted order, starting for example with the closest match, using any suitably-configured display devices (103).

Figure 4:
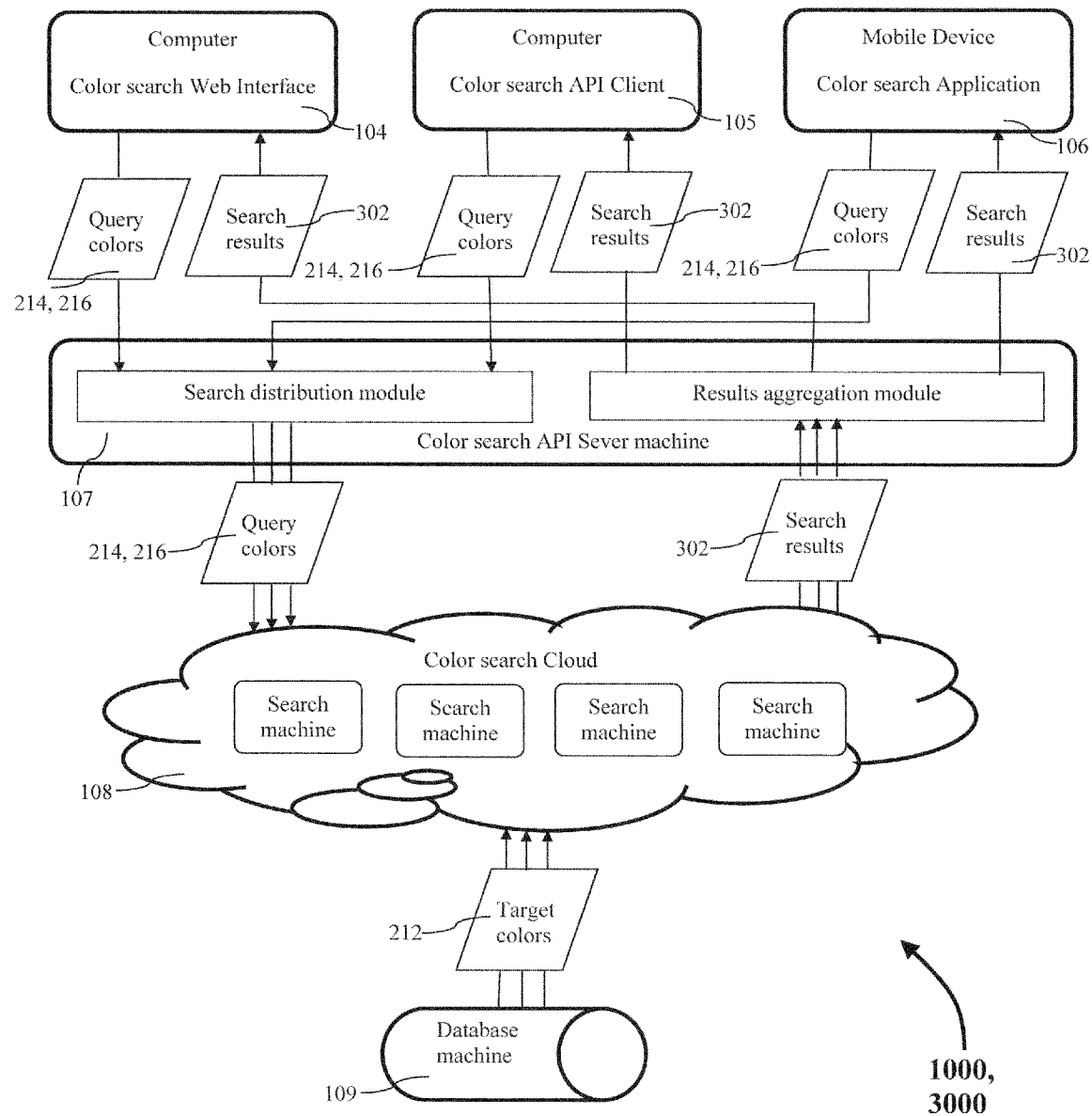
FIG. 4 is a block diagram illustrating a hardware architecture suitable for use in implementing aspects of the invention.

FIG. 4 shows a schematic diagram of an example of a hardware architecture (3000) suitable for use in implementing a color search system (1000) in accordance with the invention. In the embodiment shown, architecture (3000) comprises one or more user interface system(s) (104, 105, 106); color search API server device(s) (107); color search cloud(s) (108); and database(s) (109). Devices (104, 105, 106, 107, 108, 101, 109) may include any or all device(s) or system(s), including for example suitably-configured input/output, storage, and/or other devices, comprising processing capabilities suitable for implementing the purpose(s) described herein.

Query colors can, for example, be generated by user(s) using any one or more of a Web Interface running on a computer (104), an API Client running on a computer (105) and/or a color search application running on a mobile device (106). Generated query colors (214, 216) may be sent to an API Server machine (107) configured to distribute them to a Color Search Cloud (108) containing multiple Search Machines. The Color Search Cloud (108) can preload target colors (212) from Database Machine(s) (109) and compare the preloaded target colors (212) in parallel with each set of input query colors (214, 216). Search results (302) may be sent back to the API Server machine (107) for aggregation and sorting, and optionally to one or more computers or mobile devices (104, 105, 106) for display to requesting user(s).

Figure 2:
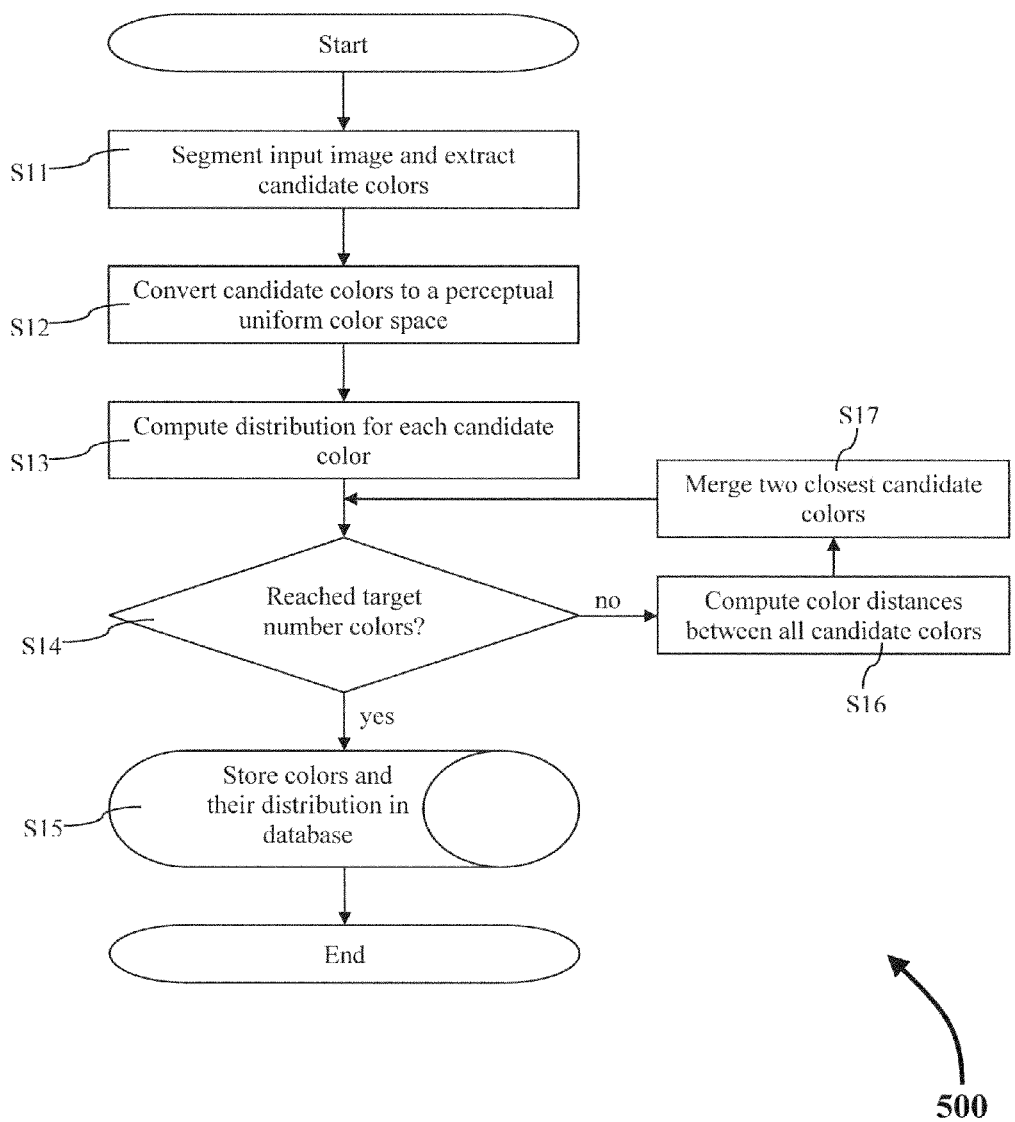
FIG. 2 is flow chart illustrating aspects of a color extraction method in accordance with the invention.

FIG. 2 illustrates an embodiment of a process or method (500) of color extraction in accordance with the disclosure. Input for such a method or process (500) can comprise one or more target and/or query images (202, 204) representing images of interest and/or potential interest to a searching user. Output can include sets of target and/or query colors (212, 214) and their distribution within images (202, 204).

In order to extract initial candidate colors, any one or more of a wide variety of image segmentation technique(s), some of which are known, and others of which may hereafter be developed, may be employed (S11). Suitable known algorithms include, for example, so-called thresholding techniques, clustering methods, histogram-based methods, and region-growing methods.

Color segmentation is the process of partitioning images into multiple sets of pixels, or segments, based on color similarity. Such segmentation can, for example, be achieved using clustering methods, which can include iterative techniques that project each pixel of an image into a color space and partition the color space into a number of clusters. The geometric center of each cluster found this way can be used to represent a candidate color. In some preferred embodiments, the invention implements very fast color clustering using a Mean Shift algorithm to identify local maximum color densities.

As will be understood by those skilled in the relevant arts, in many implementations, it can be advantageous to commence processing according to the methods disclosed herein using images represented in an RGB color space, defined by the three color values of the red, green and blue, as RGB is currently the most-commonly used color space in popular image processing. While RGB is one of the most commonly used color space, however, in some circumstances it is not optimal for color distance computation. In such circumstances, a conversion between the RGB color space and a perceptual uniform color space can be performed (S12).

A perceptual uniform color space can be considered a color space in which the Euclidean distance between any two colors corresponds to a color difference that might commonly be perceived by humans. In some embodiments, for example, the CIE LAB color space (which was first proposed by International Commission on Illumination, or CIE), can be used advantageously in color clustering processes, and for representing candidate colors.

At S13, for each candidate color a distribution may be computed based on the number of pixels assigned by the segmentation algorithm to the associated cluster, or segment. The pixels belonging to each cluster are counted and then converted to a weight value. The weight for each candidate color is equal with the ratio between the number of pixels associated with that color and the total number of pixels in the image. This way the weights of all candidate colors are adding to 1.

In some applications, the number of colors generated by a segmentation algorithm can be too large for practical implementation. This can be addressed through the use of reduction methods. In some simplified embodiment, Euclidean distances in a CIE LAB color space between candidate colors can be computed and sorted, for example in ascending order (S16). Starting with the two closest colors, the colors can be merged and associated weights added, resulting in a new candidate color (S17). Euclidean distances between the new candidate color and other remaining colors can be computed and ascending sorting of the distances performed again. A new merging can be done between the two closest colors and this iterative process can continues until a practical, efficient, or otherwise-desired target number of colors is reached (S14).

In some preferred embodiments, additional measurements may be used in order to decide which are the dominant colors. One such measurement includes color importance, which postulates that a color that is far away in the color space from all other image colors may be of relatively greater importance, even when its weight is relatively small. Moreover, saturated colors may be considered to be of relatively greater importance than unsaturated colors, because in many circumstances they can be relatively more visible to the human eye.

Further useful measurements can include color complexity, which can for example be used to describe a statistical spread of a color over an image. For example, pixels associated with a particular color can come from one single contiguous region or from multiple regions of different sizes. A color that is spread all over the images and is composed from very small regions has a lower probability of belonging to a visually-important object than a color comprised by a single contiguous region.

Further measurements can include the background color. Finding or otherwise identifying background color of an image can be desirable because in many applications it may be efficient and/or otherwise desirable to discard, or ignore, such color in image analysis processes. For example, in processing an image containing an object photographed on a white background, the white background color may frequently be considered unimportant for most of the applications that are using color search.

When performing color extraction from a set of target images, all colors and their distribution may be stored in database(s) (S15). When performing color extraction from a query image, the colors and their distribution may be used as input for the color comparison method described next.

Figure 3:
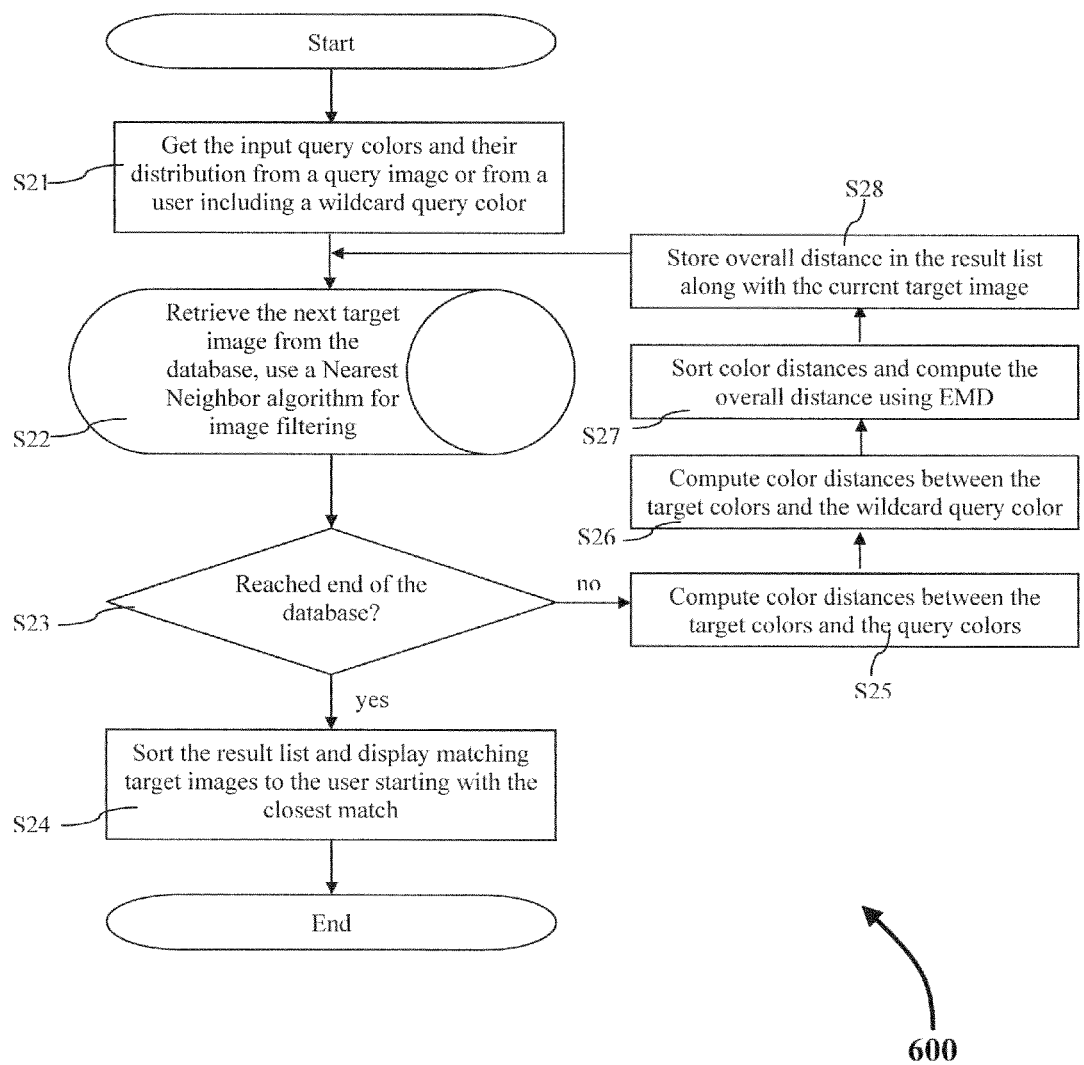
FIG. 3 is flow chart illustrating aspects of a color comparison method in accordance with the invention.

FIG. 3 illustrates an embodiment of a process or method (600) of color comparison in accordance with the disclosure. Input for such a methods or process (600) can include a set of query color definitions and their distribution (S21). Input may further include data comprising colors and their distribution associated with a set of target images (S22). Output can include list(s) comprising best-matching target images relative to the query colors, according to predefined color distance function(s) (S24). Query colors used in such process(es) can be automatically generated from query image(s) and/or can be manually defined by user(s) (S21). It is possible for query colors to not include the wildcard color, meaning the output can be restricted to images that match all corresponding query colors. Such restrictions can yield results that are overly narrow for some applications. If wildcard color(s) are included, the results can be broader in color palette, which in many applications can be a desirable trait for the user.

Figure 5:
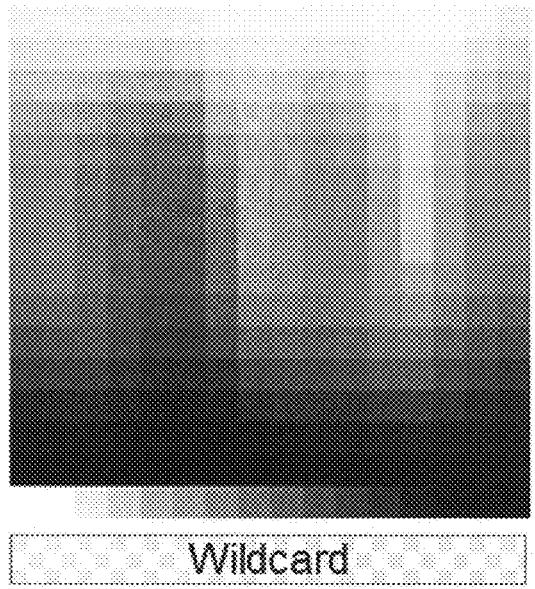
FIG. 5 is a representation of a portion of user interface suitable for presentation on a computer display, for enabling entry of query data in accordance with aspects of the invention.
Figure 5:
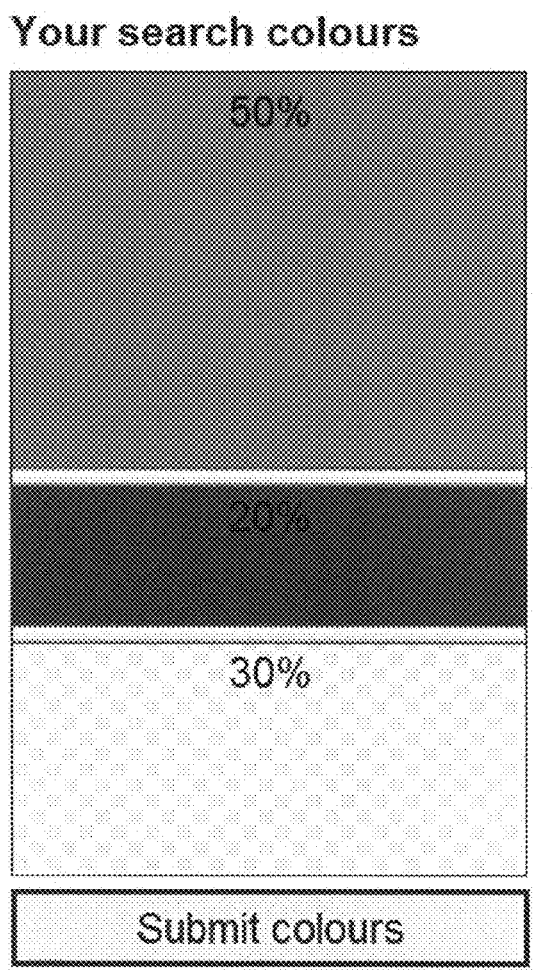

FIG. 5 illustrates a user interface suitable for choosing query colors. Such interface may be implemented using, for example, a color picker for selecting colors and a color slider for defining overall weights for selected colors. Suitable color sliders can allow user(s) to define color weights so that sum is less than or equal to 1. When the sum of weights is less than 1, the difference between 1 and the sum represents the weight of the wildcard color.

Figure 6:
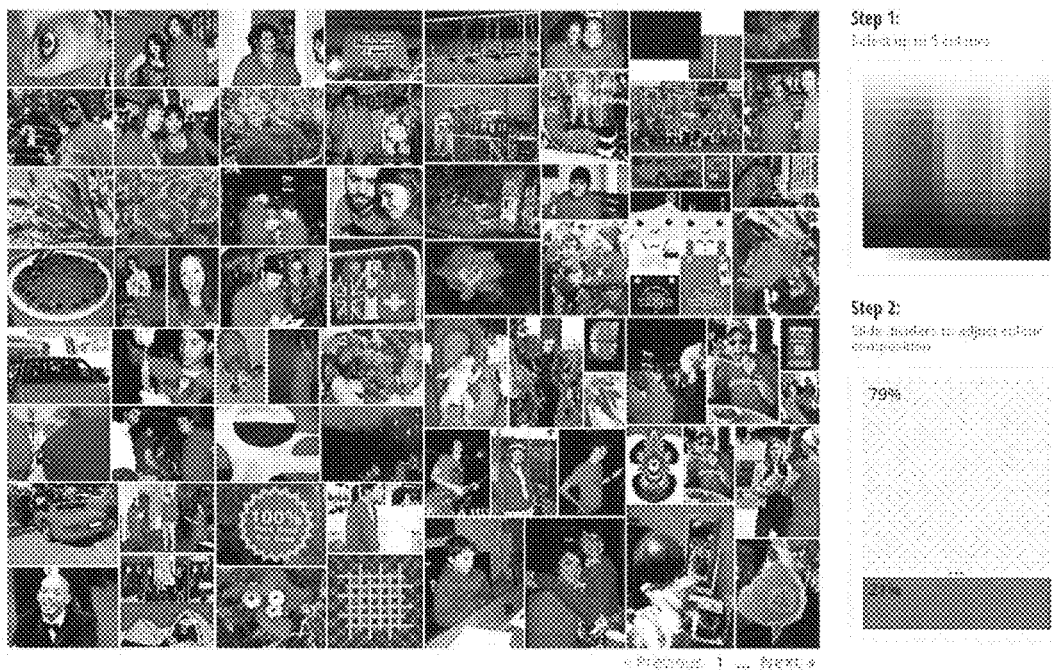
FIGS. 6 and 7 are representations of computer displays showing color search results in accordance with the invention.

FIG. 6 illustrates a user interface suitable for use in displaying search results. On the right side of the display a color picker consistent with that shown in FIG. 5 is displayed. In the example shown, query colors are, as indicated, 21% red and 79% wildcard, as indicated by the notation "79%" with the chequered neutral background pattern. Best matching images identified within a database (101) are presented to the user as uneven tiles in a rectangular grid at left of the display screen.

Figure 7:
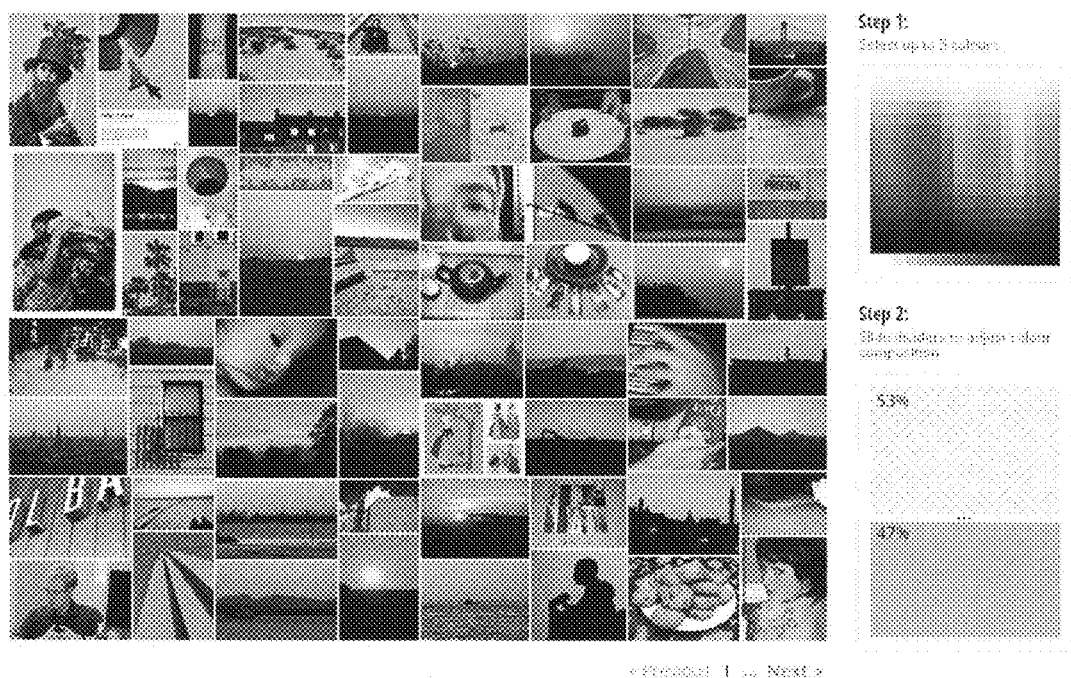

FIG. 7 illustrates a user interface similar to that of FIG. 6, wherein the query colors are 47% orange and 53% wildcard.

In one embodiment, the comparison method illustrated in FIG. 3 compares all target images stored in the database (101) with the query colors. This approach may be particularly advantageous for use in processing relatively small image sets, as it may be too slow for practical, convenient, efficient, or otherwise desirable processing using image collections containing millions or billions of images. For such reasons, in some embodiments, target images may filtered first using a Nearest Neighbor method that discards most, or other portions, of the search database (101) and produces a relatively small set of candidate target images (S22). Candidate target images may be compared with query colors with improved efficiency following such filtering.

In some embodiments, the Nearest Neighbor method uses a four dimensional space for image filtering. Three of the dimensions can include color channels associated with a three dimensional color space, while the fourth dimension contains the color weights. In some such embodiments, the CIE LAB color space can be used with particular advantage by the Nearest Neighbor method.

Each database color can be projected offline into the four dimensional space. At the search time, the query colors can be projected as well, and all database colors located nearby them in this four dimensional space are labeled as candidate colors. Target images containing at least a certain number of the candidate colors can be labeled as candidate target images. In a preferred embodiment, a Nearest Neighbor algorithm may be employed, using for example a KD-Tree structure for storing database colors and sorting and building list(s) of candidate target images. As is known to those skilled in the relevant arts, KD-trees are binary trees in which nodes are defined as K-dimensional points. Non-leaf nodes can be used to generate hyperplanes that divide the K-dimensional space into binary parts known as half-spaces, which can be used to rank candidate image matches.

Between the query colors and each candidate target image, a overall distance may be computed using, for example, an Earth Mover's Distance (EMD) algorithm. To illustrate use of such an algorithm, the following example is provided. Two equal quantities of dirt are given and each one of those quantities is split into multiple piles of dirt. These two sets of piles of dirt created this way are placed on a plain. The EMD is the minimum cost of turning one set of piles into the other set of piles, where the cost is assumed to be amount of dirt moved times the distance by which it is moved.

The comparison method presented here generates these two sets of piles from the target and query colors and their distribution. The number of piles in each set is equal with the number of colors extracted from each image, the amount of dirt present in each pile is equal with the associated color's weight, and the distance between two piles is equal with the Euclidean distance between the associated colors.

Euclidean distances in CIE LAB color space(s) between target color(s) and query color(s) may be computed and stored in a list (S25). If wildcard color have been designated for use in the matching process, distance(s) between the target color(s) and the wildcard query color may be computed and stored in the same or another list (S26).

The distance between a target color and the wildcard query color may, for example, be computed as being inversely proportional to the distance between that particular target color and the closest query color. In this way, a small distance between a target color and the closest query color can produce a large distance between that particular target color and the wildcard query color. This can mean that the wildcard query color is not a good match for the target color, because a better matching query color was already found. On the other hand, a large distance between a target color and the closest query color can result in a small distance between that particular target color and the wildcard query color, with the resulting inference that the wildcard query color is a good match for the target color, because a better matching query color has not been identified.

A list containing all color distances can be sorted in, for example, ascending order and, according to the EMD algorithm, an overall distance can be computed (S27). The first entry in such a distance list can identify the two closest target and query colors. The quantity that needs to be moved or assigned can be computed as the smallest weight of these two colors. The cost of assigning one color to the other can be computed by multiplying the smallest weight with the distance between these two colors. Then the smallest weight can subtracted from the weights of the target and query colors. In such implementations, one of the two colors will end up with 0 weight after this operation, which indicates that that color has been completely assigned. An overall distance value can be initialized using the cost computed above.

The next entry in the distance list can contain a next-best pair of matching target and query colors. The quantity that needs to be moved is computed again as the smallest weight of these two new colors. If the quantity is 0, an inference may be made that one of these two colors was completely assigned and consequently the cost is 0, otherwise the cost is computed the same way it was done for the first entry. Then the cost is added to the overall distance, the smallest weight is subtracted from the weights of the target and query colors, and next entry in the distance list is processed. This iterative process can continue until the end of the distance list is reached.

Using such an approach, the overall distance will typically be relatively small for a target image containing colors close to the query colors and with the same, or substantially the same, weights. Also the overall distance will be minimized where a target image includes one color distinct (notionally "far away") from all query colors, and with the same relative weight as the query wildcard color; or for example where target image contains relatively few colors located far from all query colors and with the sum of their weights substantially equal with the weight of the wildcard query color.

Wildcard query color may be processed in the same manner as the other query colors and needs to be completely assigned to one or few target colors. However, in otherwise preferred embodiments of the invention, the cost of assigning a query wildcard color to target colors can multiplied with scaling factor(s) before being added to the overall distance. The scaling factor can be chosen to be less than 1, therefore the wildcard query color can be caused to have less impact to the overall distance than a regular query color. This can mean, for example, that finding target images that are matching closely the query colors is more important than finding target images that are matching the wildcard query color.

Following is an example of distance computation between query colors and a candidate target image using Earth Mover's Distance (EMD) algorithm. Each query color can be represented by three color values in CIE LAB color space and one weight value, such that the query color data comprises N color data records of the form:

$\langle QL1 \rangle \langle QA1 \rangle \langle QB1 \rangle \langle QW1 \rangle$ $\langle QL2 \rangle \langle QA2 \rangle \langle QB2 \rangle \langle QW2 \rangle$

...

$\langle QLN \rangle \langle QAN \rangle \langle QBN \rangle \langle QWN \rangle$ where:
QLN=the first color value for the Nth query color
QAN=the second color value for the Nth query color
QBN=the third color value for the Nth query color
QWN=the weight value for the Nth query color Additionally a wildcard query color may be used. In such case the sum of weight values for the query colors should be less then 1, implying the following weight computation for the wildcard query color:

$<QWW>=1-(<QW1>+<QW2>+\ldots+<QWN>)$

Each color extracted from the target image can be represented by three color values in CIE LAB color space and one weight value, such that the target color data comprises M color data records of the form:

$\langle TL1 \rangle \langle TA1 \rangle \langle TB1 \rangle \langle TW1 \rangle$ $\langle TL2 \rangle \langle TA2 \rangle \langle TB2 \rangle \langle TW2 \rangle$

...

$\langle TLM \rangle \langle TAM \rangle \langle TBM \rangle \langle TWM \rangle$ where:
TLM=the first color value for the Mth target color
TAM=the second color value for the Mth target color
TBM=the third color value for the Mth target color
TWM=the weight value for the Mth target color The sum of weight values for the target colors must be equal to 1.

$<TW1>+<TW2>+\ldots+<TWM>=1$

The distance between each query and target color can be computed, for example, using Euclidean distance:

$$\langle DQ1T1 \rangle = SqRoot(Pow2(QL1-TL1)+Pow2(QA1-TA1)+Pow2(QB1-TB1))$$

$$\langle DQ1T2 \rangle = SqRoot(Pow2(QL1-TL2)+Pow2(QA1-TA2)+Pow2(QB1-TB2))$$

...

$$\langle DQ1TM \rangle = SqRoot(Pow2(QL1-TLM)+Pow2(QA1-TAM)+Pow2(QB1-TBM))$$

$$\langle DQ2T1 \rangle = SqRoot(Pow2(QL2-TL1)+Pow2(QA2-TA1)+Pow2(QB2-TB1))$$

$$\langle DQ2T2 \rangle = SqRoot(Pow2(QL2-TL2)+Pow2(QA2-TA2)+Pow2(QB2-TB2))$$

...

$$\langle DQ2TM \rangle = SqRoot(Pow2(QL2-TLM)+Pow2(QA2-TAM)+Pow2(QB2-TBM))$$

$$\langle DQNT1 \rangle = SqRoot(Pow2(QLN-TL1)+Pow2(QAN-TA1)+Pow2(QBN-TB1))$$

$$\langle DQNT2 \rangle = SqRoot(Pow2(QLN-TL2)+Pow2(QAN-TA2)+Pow2(QBN-TB2))$$

...

$$\langle DQNTM \rangle = SqRoot(Pow2(QLN-TLM)+Pow2(QAN-TAM)+Pow2(QBN-TBM))$$

where:
- SqRoot( )=square root function (take square root of its argument)
- Pow2( )=power function (raises its argument at the second power)
- DQNTM=the distance between Nth query color and Mth target color For simplicity purposes it is assumed that all color values QL, QA, QB, TL, TA, TB were normalized beforehand to a [0, 1] range. This means that all distance values DQMTN are in the same [0, 1] range. In such case the distance between wildcard query color and each target color can be computed as following:

$$\langle DQWT1 \rangle = 1 - \text{Min}(\langle DQ1T1 \rangle, \langle DQ2T1 \rangle, \ldots, \langle DQNT1 \rangle)$$

$$\langle DQWT2 \rangle = 1 - \text{Min}(\langle DQ1T2 \rangle, \langle DQ2T2 \rangle, \ldots, \langle DQNT2 \rangle)$$

...

$$\langle DQWTM \rangle = 1 - \text{Min}(\langle DQ1TM \rangle, \langle DQ2TM \rangle, \ldots, \langle DQNTM \rangle)$$

where:
- Min( )=minimum function (compute minimum value for its arguments)
- DQWTM=the distance between query wildcard color and Mth target color All color distances computed in this manner can be sorted in ascending order resulting a list with N×M values that can contain, for example, the following entries:

$$(DQ2T1, DQ3T4, DQWT2, \ldots, DQ1T3)$$

The overall distance between query and target colors can be computed using, for example, an EMD iterative approach as illustrated below.

Initializations:
  initialize the overall distance between query and target colors:

$$\langle OD \rangle = 0$$

chose a scaling factor to be used for query wildcard color:

$$\langle SW \rangle = X \text{ where } X > 0 \text{ and } X < 1$$

First iteration:
  retrieve first entry from the sorted distance list: DQ2T1 (the distance between query color Q2 and target color T1)
  compute minimum weight for these two colors:

$$\langle MW \rangle = \text{Min}(\langle QW2 \rangle, \langle TW1 \rangle)$$

update the weights for these two colors:

$$\langle QW2 \rangle = \langle QW2 \rangle - \langle MW \rangle$$

$$\langle TW1 \rangle = \langle TW1 \rangle - \langle MW \rangle$$

update the overall distance:

$$\langle OD \rangle = \langle OD \rangle + (\langle DQ2T1 \rangle * \langle MW \rangle)$$

Second iteration:
  retrieve the second entry from the sorted distance list: DQ3T4 (the distance between query color Q3 and target color T4)
  if one of the weights (QW3 or TW4) is zero go to the next entry in the distance list
  otherwise compute minimum weight for these two colors:

$$\langle MW \rangle = \text{Min}(\langle QW3 \rangle, \langle TW4 \rangle)$$

update the weights for these two colors:

$$\langle QW3 \rangle = \langle QW3 \rangle - \langle MW \rangle$$

$$\langle TW4 \rangle = \langle TW4 \rangle - \langle MW \rangle$$

update the overall distance:

$$\langle OD \rangle = \langle OD \rangle + (\langle DQ3T4 \rangle * \langle MW \rangle)$$

Third iteration:
  retrieve the third entry from the sorted distance list: DQWT2 (the distance between query wildcard color and target color T2)
  if one of the weights (QWW or TW2) is zero go to the next entry in the distance list
  otherwise compute the minimum weight for these two colors:

$$\langle MW \rangle = \text{Min}(\langle QWW \rangle, \langle TW2 \rangle)$$

update the weights for these two colors:

$$\langle QWW \rangle = \langle QWW \rangle - \langle MW \rangle$$

$$\langle TW2 \rangle = \langle TW2 \rangle - \langle MW \rangle$$

update the overall distance (because the wildcard query color is involved the wildcard scaling factor can be used):

$$\langle OD \rangle = \langle OD \rangle + (\langle DQWT2 \rangle * \langle MW \rangle * \langle SW \rangle)$$

(N×M)th iteration:
  retrieve the last entry from the sorted distance list: DQ1T3 (the distance between query color Q1 and target color T3)
  if one of the weights (QW1 or TW3) is zero stop
  otherwise compute the minimum weight for these two colors:

$$\langle MW \rangle = \text{Min}(\langle QW1 \rangle, \langle TW3 \rangle)$$

update the weights for these two colors:

$$\langle QW1 \rangle = \langle QW1 \rangle - \langle MW \rangle$$

$$\langle TW3 \rangle = \langle TW3 \rangle - \langle MW \rangle$$

update the overall distance:

$$\langle OD \rangle = \langle OD \rangle + (\langle DQ1T3 \rangle * \langle MW \rangle)$$

The overall distance computed for a candidate target image <OD> can be stored in a result list (S28). Then the next candidate target image can be retrieved from database (S22) and its overall distance computed according to method(s) described above. Such iterative processes can continue until the end of the database or pool of comparative images is reached (S23). The result(s) list can be sorted in ascending order and the matching target images displayed to the user, starting for example with the closest match (S24).

Optionally, lists of matching target images can be filtered using various other comparison methods before being displayed to the user(s). This can for example be done in order to improve the results by removing matching target images that have the same color distribution as the query image but are totally different from other points of view, such as for example texture, shape, and/content.

In various preferred embodiments, metadata can be used to filter the results. As is understood by those skilled in the relevant arts, metadata can be information associated with an image that contains various types of data about that image, such as set(s) of keywords describing the content of the image, the source of the image, date(s) associated with the image, etc. In some preferred embodiments, only target images associated with similar keywords as the query image are kept in order to generate a match list containing images with the same color distribution and approximately the same content.

One application of the technology described herein is searching through large collections of images representing, and/or otherwise related to or associated with, specific objects like clothes, shoes, fabrics or other products or items. When using metadata search capabilities, a product vendor can, for example, find all of its products priced less then $50.00, in the 'shoe' category that most closely match a particular shade of orange. Or, as another example, all products in the 'T-shirt' category that are mostly blue but contain other colors as well.

Another use of the disclosed technology is to help users search through personal or other photograph collection(s) to find specific image(s). For example, a user may be looking for a photograph of a friend wearing a red shirt on a hiking trip they took together many years ago. Because of the high volume of digital photos this user has, it may be difficult to sort through many thousands of image to find this image. With wildcard color searching, the user can search for a photograph that has some red and some blue (e.g., for the sky), with remaining possibilities being covered by the wildcard color. This approach can greatly filter the number of images that need to be reviewed to find the desired photograph.

Another application of the disclosed technology is searching through very large collections, containing for example hundreds of millions of stockphoto images, or billions of web images in order to find some or all images that best match a query image or few query colors.

Since it can be particularly advantageous for an image search engine in accordance with the disclosure to be able to cope with billions of images, it can be useful to employ various low-level optimizations. In various preferred embodiments, for example, the C++ programming language can be used to implement the search engine. Such an engine can perform, in less than 1 second, searches of databases containing more than 200 million images, using just one machine. This means that using this technology a modest number of machines can support fast color searches through billions of web images.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

What is claimed is:

1. An image searching system comprising: at least one processor configured to:
    extract dominant colors and their distribution from a set of images, wherein extracting the dominant colors and their distribution comprises applying a color reduction which includes using at least one of color merging, color importance, color complexity or background color;
    store the dominant colors and their distribution in a database; and
    compare a set of query colors including a wildcard color with a set of database colors to generate a sorted list of matching database images.

2. An image searching system according to claim 1 wherein extracting the dominant colors and their distribution comprises using an image segmentation technique applied to a perceptual uniform color space.

3. An image searching system according to claim 1 wherein the database holds a four dimensional Nearest Neighbor structure consisting of three perceptual uniform color channels and one color weight.

4. An image searching system according to claim 1 wherein a custom color picker is employed in order to allow a user to include a wildcard color among the query colors.

5. An image searching system according to claim 1 wherein the color comparison is done using multiple query colors and one wildcard color.

6. An image searching system according to claim 1 wherein the color comparison employs a method that uses Earth Mover's Distance (EMD) algorithm in order to compute a distance between a wildcard color and a set of database colors.

7. An image searching system according to claim 1 wherein the set of query colors including the wildcard color is compared with a set of database colors producing a list of matching database images.

8. An image searching system according to claim 7 wherein the list of matching database images is sorted using a color distance.

9. An image searching system according to claim 1 wherein the sorted list of matching database images is filtered using metadata.

10. A method for image searching, the method comprising:
    extracting, by at least one processor, dominant colors and their distribution from a set of images, wherein extracting the dominant colors and their distribution comprises applying a color reduction which includes using at least one of color merging, color importance, color complexity or background color;
    storing the dominant colors and their distribution in a database; and
    comparing a set of query colors including a wildcard color with a set of database colors to generate a sorted list of matching database images.

11. The method of claim 10 wherein extracting the dominant colors and their distribution comprises using an image segmentation technique applied to a perceptual uniform color space.

12. The method of claim 10 wherein the database holds a four dimensional
    Nearest Neighbor structure consisting of three perceptual uniform color channels and one color weight.

13. The method of claim 10 comprising: employing a custom color picker to allow a user to include a wildcard color among the query colors.

14. The method of claim 10 wherein comparing the set of query colors uses multiple query colors and one wildcard color.

15. The method of claim 10 wherein comparing the set of query colors comprises employing Earth Mover's Distance (EMD) algorithm to compute a distance between a wildcard color and a set of database colors.

16. The method of claim 10 wherein the set of query colors including the wildcard color is compared with a set of database colors producing a list of matching database images.

17. The method of claim 16 wherein the list of matching database images is sorted using a color distance.

18. The method of claim 10 wherein the sorted list of matching database images is filtered using metadata.

19. A non-transitory, computer readable medium or media having stored thereon computer readable instructions which when executed by at least one processor configure the at least one processor for:
- extracting, by the at least one processor, dominant colors and their distribution from a set of images, wherein extracting the dominant colors and their distribution comprises applying a color reduction which includes using at least one of color merging, color importance, color complexity or background color;
- storing the dominant colors and their distribution in a database; and
- comparing a set of query colors including a wildcard color with a set of database colors to generate a sorted list of matching database images.

* * * * *